(12) United States Patent
Shi et al.

(10) Patent No.: US 8,681,594 B1
(45) Date of Patent: Mar. 25, 2014

(54) METHOD AND SYSTEM FOR IMPROVING LASER ALIGNMENT AND OPTICAL TRANSMISSION EFFICIENCY OF AN ENERGY ASSISTED MAGNETIC RECORDING HEAD

(71) Applicant: Western Digital (Fremont), LLC, Fremont, CA (US)

(72) Inventors: Zhong Shi, Dublin, CA (US); Arkadi B. Goulakov, Fremont, CA (US); Alexandre V. Demtchouk, Sunnyvale, CA (US); Lei Wang, Fremont, CA (US); Michael V. Morelli, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/631,641

(22) Filed: Sep. 28, 2012

(51) Int. Cl.
*G11B 7/00* (2006.01)

(52) U.S. Cl.
USPC ........................................ 369/112.27

(58) Field of Classification Search
None
See application file for complete search history.

(56) References Cited

U.S. PATENT DOCUMENTS

| | | | |
|---|---|---|---|
| 6,694,076 B2 | 2/2004 | Crafts | |
| 6,873,638 B2 | 3/2005 | Haase et al. | |
| 7,184,625 B2 | 2/2007 | Gunn, III et al. | |
| 7,483,229 B2 | 1/2009 | Rausch et al. | |
| 2003/0179426 A1 | 9/2003 | Ide | |
| 2011/0090770 A1* | 4/2011 | Iwanabe et al. | 369/13.24 |
| 2011/0216635 A1 | 9/2011 | Matsumoto | |
| 2012/0051195 A1* | 3/2012 | Shimizu | 369/13.17 |
| 2012/0201491 A1* | 8/2012 | Zhou | 385/14 |

\* cited by examiner

*Primary Examiner* — Paul Huber

(57) ABSTRACT

An EAMR disk drive includes a media, a laser, and a slider coupled with the laser. The laser for provides energy. The slider has an air-bearing surface, a laser input side, an EAMR transducer and an antireflective coating (ARC) layer occupying a portion of the laser input side. The ARC layer is configured to reduce back reflections of the energy. The EAMR transducer includes a write pole, a waveguide optically coupled with the laser and at least one coil. The waveguide has a waveguide input. A portion of the ARC layer resides between the laser and the waveguide input. A method aligns the laser to the ARC layer, and then aligns the laser to the waveguide input. The laser may then be coupled to the slider.

20 Claims, 4 Drawing Sheets

METHOD AND SYSTEM FOR IMPROVING LASER ALIGNMENT AND OPTICAL TRANSMISSION EFFICIENCY OF AN ENERGY ASSISTED MAGNETIC RECORDING HEAD

BACKGROUND

In fabricating disk drives, such as energy assisted magnetic recording (EAMR) disk drives, it may be necessary to align and bond components. For example, in conventional EAMR disk drives, a laser provides energy used to heat the media for magnetic recording. The laser typically takes the form of a laser diode. The laser diode may be desired to be aligned with a waveguide on the slider and bonded with the slider.

FIG. 1 depicts a conventional method 10 for aligning a conventional laser diode (or substrate on which the laser diode resides) and a slider. FIG. 2 depicts a conventional EAMR head 50 during fabrication using the conventional method 10. FIG. 2 depicts a plan view of the slider 60 and laser 70. The slider 60 and laser 70 include conventional alignment marks 62 and 72, respectively. Also shown are the laser output 74 on the laser and the corresponding laser spot 76 on the slider once alignment has been completed. The slider includes a waveguide 64 which is to be aligned to the laser spot 76.

The slider 60 and laser 70 are aligned using alignment marks 62 and 72 as well as the laser output 66 from the slider, via step 12. Typically this process includes aligning the alignment marks 62 on the laser 60 with the alignment marks 72 on the slider substrate 72. Thus, a coarse alignment may be achieved. However, this coarse alignment is typically insufficient to align the laser spot 76 with the waveguide 64. Once the coarse alignment is performed, therefore, the laser output 66 is monitored. The laser output 66 outputs light from the laser 60 that has traversed the waveguide 64 to the ABS and returned to the back side of the slider 60. When the energy from the laser output 66 is a maximum, alignment in step 12 is completed.

Once alignment has been achieved, the slider 60 and laser 70 are bonded together, via step 14. Typically, step 14 includes heating the laser 70 and/or slider 60 to reflow the solder pads (not shown in FIG. 2). Mechanical and electrical connection is made between the substrates 60 and 70 by solder pads, which have been reflowed together.

Although the conventional method 10 may function, the method 10 may be problematic. Alignment between the laser spot 76 and the waveguide 64 may be difficult and time consuming to achieve. Thus, production and/or yield of the conventional EAMR head 50 may be adversely affected. In addition, back reflections from the waveguide 64 to the output 74 of the laser may damage the laser 70. Thus, performance and reliability of the conventional EAMR head 50 may suffer. Some conventional EAMR heads 50 cover the surface of the conventional slider 60 that faces the conventional laser 70 with an antireflective coating (ARC) layer. Although this may mitigate issues due to back reflections, manufacturability of such a conventional EAMR head 50 may still suffer Accordingly, what are needed are improved methods and systems for improving manufacturability of EAMR disk drives.

BRIEF SUMMARY OF THE INVENTION

An EAMR disk drive includes a media, a laser, and a slider coupled with the laser. The laser for provides energy. The slider has an air-bearing surface, a laser input side, an EAMR transducer and an antireflective coating (ARC) layer occupying a portion of the laser input side. The ARC layer is configured to reduce back reflections of the energy. The EAMR transducer includes a write pole, a waveguide optically coupled with the laser and at least one coil. The waveguide has a waveguide input. A portion of the ARC layer resides between the laser and the waveguide input. A method aligns the laser to the ARC layer, and then aligns the laser to the waveguide input. The laser may then be coupled to the slider.

DETAILED DESCRIPTION OF EMBODIMENTS OF THE INVENTION

Figure 1:
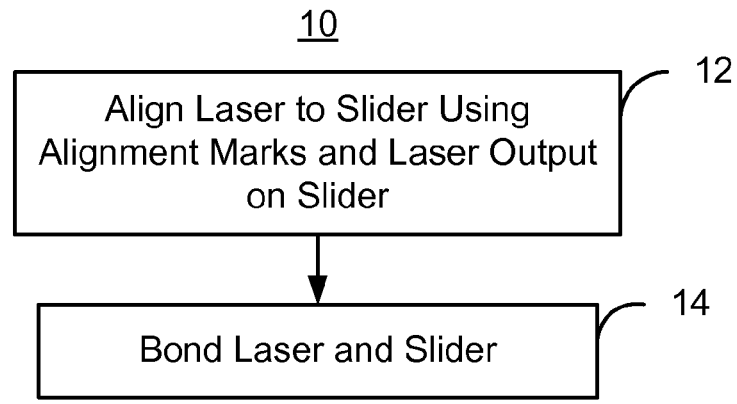
FIG. 1 is a flow chart depicting a conventional method for bonding a conventional laser diode and a conventional slider.
Figure 2:
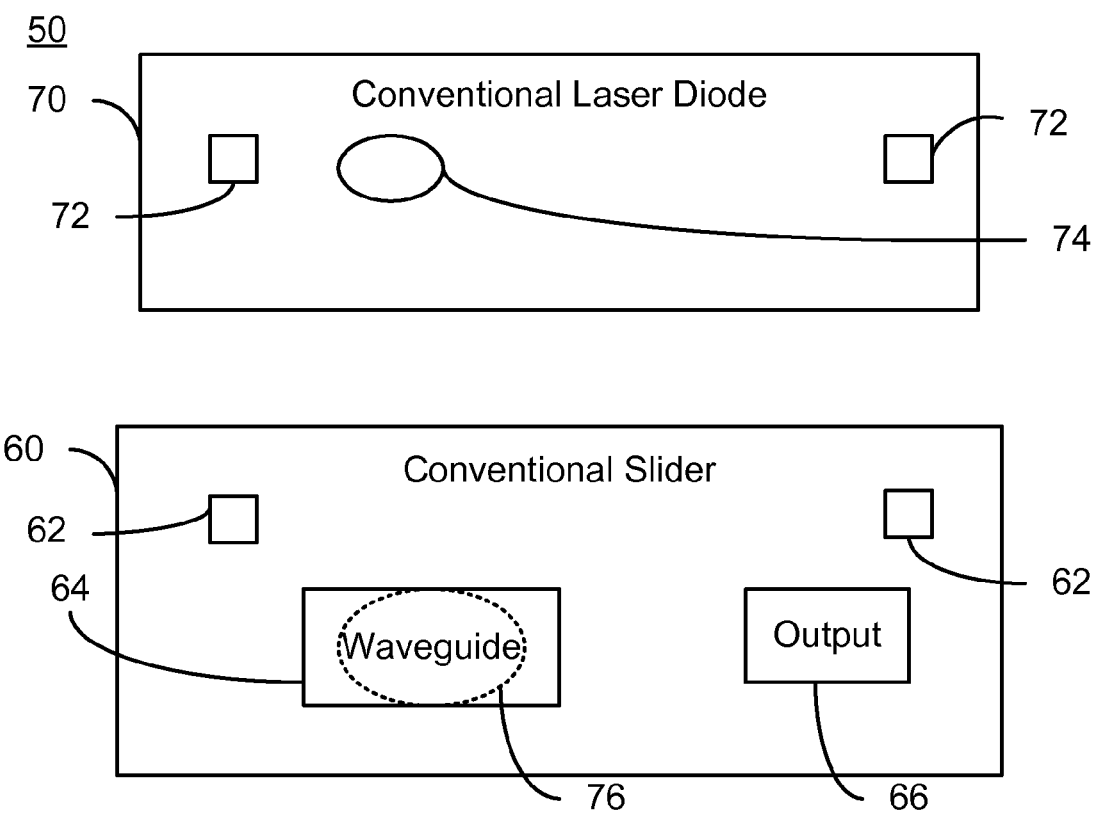
FIG. 2 depicts plan views of the conventional laser diode and slider during bonding.
Figure 3:
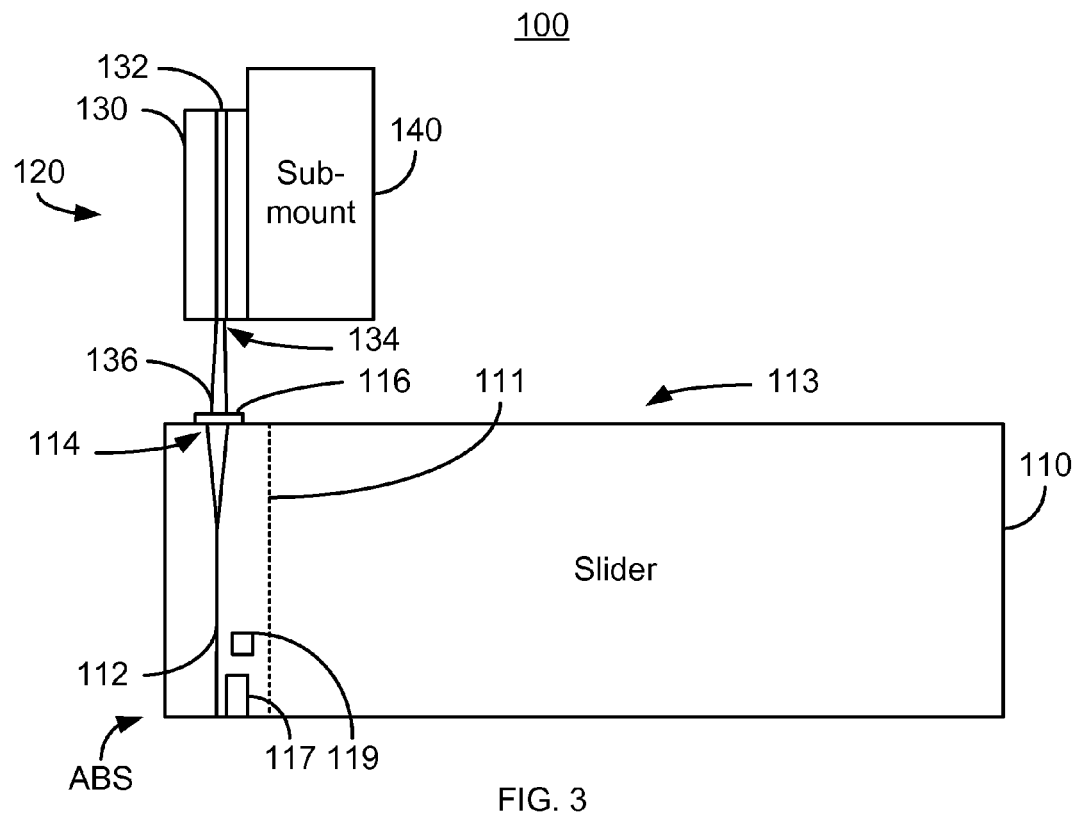
FIGS. 3-6 depict views of an exemplary embodiment of an EAMR disk drive.
Figure 4:
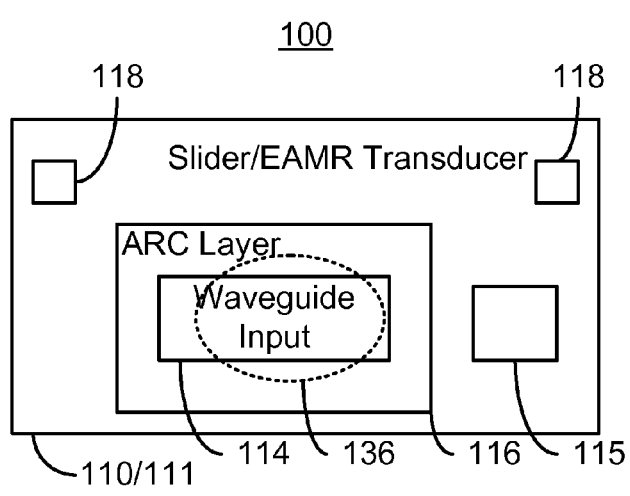
Figure 5:
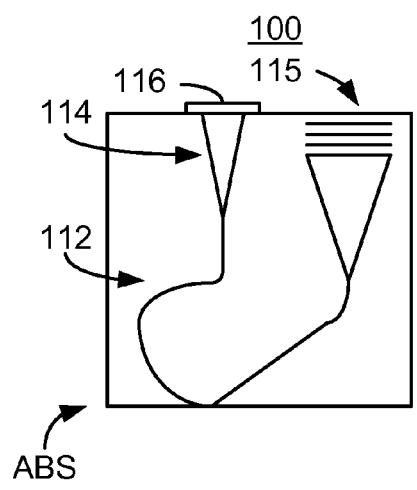
Figure 6:
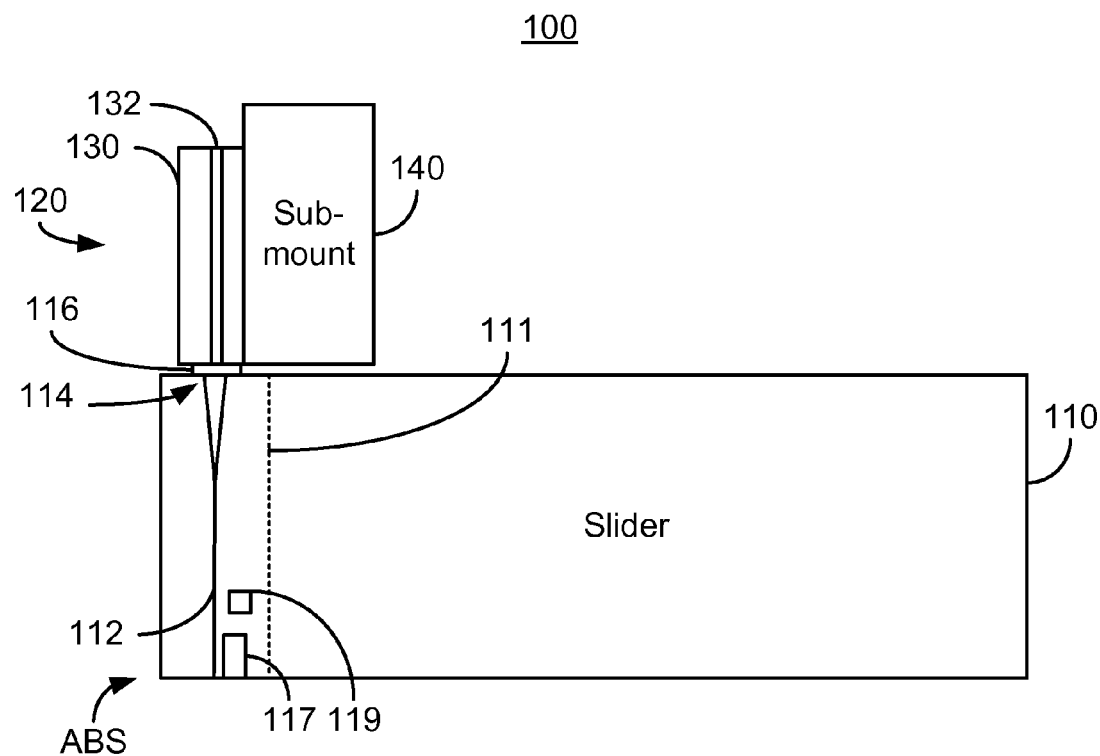

FIGS. 3-6 depict an exemplary embodiment of an EAMR disk drive 100. For clarity, FIGS. 3-6 are not to scale. For simplicity not all portions of the EAMR disk drive 100 are shown. Although the EAMR disk drive 100 is depicted in the context of particular components other and/or different components may be used. Further, the arrangement of components may vary in different embodiments. FIGS. 3 and 6 are side views of the EAMR disk drive 100 during and after, respectively, alignment of components. The EAMR disk drive 100 includes a slider 110, a media (not shown) such as a disk and a laser assembly 120. In FIG. 3, the laser assembly 120 is separated from the slider by a certain distance. In FIG. 6, the laser assembly 120 has been affixed to the slider 110.

The laser assembly 120 includes a laser diode 130 and a laser sub-mount 140. The laser diode 130 includes a laser cavity 132 and emission exit 134. Laser light is generated in the laser cavity 132 and is output via the emission exit 134. Emitted laser light 136 is also shown. The submount 140 may be used to provide mechanical stability for the laser diode 130 and to mount the laser diode 130 to the slider 120. In another embodiment, the submount 140 may be omitted and/or another type of laser 130 used. The emitted laser light 136 forms a laser spot 136 on the slider 110.

The slider 110 includes an air-bearing surface (ABS), a laser input side 113, an EAMR transducer 111 and an antireflective coating (ARC) layer 116. The laser input side 113 faces the laser 130. In the embodiment shown, the laser input side 113 is opposite to the ABS. However, in another embodiment, the laser input side 113 could have another relationship to the ABS. The EAMR transducer 111 includes a waveguide 112, a write pole 117 and coil(s) 119. For simplicity, the write pole 117 and coil(s) 119 are simply shown as blocks in the EAMR transducer 111.

FIG. 4 depicts a portion of the laser input side 113 of the slider 100. The ARC layer 116 is on the laser input side 113 and resides between the laser 130 and the input 114 of the waveguide 112. The slider 110 may optionally include alignment marks 118 used in aligning the slider 110 with the laser assembly 120. The laser assembly 120 may also include alignment marks (not shown) corresponding to the alignment marks 118 on the slider 110. As shown in FIG. 4, the laser light forms a spot 136 on the laser input side 113 of the slider 110.

FIG. 5 depicts a portion of the EAMR disk drive 100 that includes the waveguide 112 and the ARC layer 116. Although a particular configuration for the waveguide 112 is shown, other configurations including but not limited to multiple waveguides may be used. As can be seen in FIG. 5, the waveguide 112 includes the input 114 as well as an output 115. The waveguide 112 thus directs laser light 136 from the input 114 to the ABS. At the ABS, a significant portion of the laser light is coupled out to the media, for example using a near-field transducer (not shown). A portion of the light is also directed to the output 115. The light emitted from the output 115 may be used in aligning the laser 130 to the waveguide input 114 as described below.

As can be seen in FIGS. 3-6, the ARC layer 116 resides between the laser 130 and the input 114 of the waveguide 112. The ARC layer 116 may include at least one of a $MgF_2$ layer, a $Ta_2O_5$ layer, a $SiO_2$ layer and a $Si_3N_4$ layer. In some embodiments, the ARC layer 116 is a single layer. In other embodiments, the ARC layer 116 is a multilayer. The total thickness of the ARC layer 116 is generally one-fourth of the wavelength of the light emitted by the laser 130. The ARC layer 116 thus can reduce back reflections for the laser light 136 incident on the waveguide input 114.

The ARC layer 116 also occupies only a portion of the laser input side 113 of the slider 110. The area of the laser input side 113 occupied by the ARC layer 116 is larger than the waveguide input 114 but significantly smaller than the total area of the laser input side 113 of the slider 110. In addition, the portion of the laser input side 113 occupied by the ARC layer 116 is larger than the laser spot size 136. In some embodiments, the ARC layer 116 is at least twice the laser spot size 136. In some embodiments, the region of the laser input side 113 occupied by the ARC layer 116 terminates within a laser spot diameter of the edges of the input 114 of the waveguide. For example, if the laser spot 136 has a diameter of one micron at the laser input side 113, then the ARC layer 116 has edges that are not more than one micron from the edges of the waveguide input 114. In the embodiment shown in FIGS. 3-6, the ARC layer 116 is rectangular in shape. In some embodiments, the rectangle is least eight microns long and eight microns wide. In some such embodiments, the rectangle is least ten microns long and ten microns wide. However, in other embodiments, the ARC layer 116 may have another shape and/or another size. For example, the ARC layer 116 may be a square, an ellipse, a circle or have another shape. In some embodiments, the shape of the ARC layer 116 is substantially the same as the shape as the laser spot 116.

In addition to reducing or substantially eliminating back reflections, the ARC layer 116 may facilitate alignment of the laser 130 and the waveguide 112 of the EAMR transducer 111. During alignment of the laser 130 with the slider 110, the laser spot 136 from the laser may be aligned with the ARC layer 116. The ARC layer 116 covers a small portion of the laser input side 113 of the slider 110 that includes the waveguide input 114. Aligning the laser spot 136 with the ARC layer 116 thus performs a coarse alignment. A fine alignment may then be carried out, for example by monitoring the light at the waveguide output 115. A maximum in the signal at the waveguide output 115 corresponds to the laser spot 136 being aligned with the waveguide input 114. The laser assembly 120 may then be affixed to the slider 110. Such a situation is depicted in FIG. 6.

Once the laser 130 has been aligned with and bonded to the slider, as shown in FIG. 6, the EAMR disk drive 100 may function as desired. In particular, the laser 130 provides energy to the input 114 of the waveguide 112 in the form of laser light/the laser spot 136. The waveguide 112 directs the energy from the laser 130 to the ABS. In some embodiments, the energy is directed to a near-field transducer (not shown). The energy from the laser is focused onto a region of the media (not shown), which is heated. The write pole 117 is energized by the coils 119 and writes to the heated region of the media.

The manufacturability, performance and reliability of the EAMR disk drive 100 may be improved. Use of the ARC layer 116 may reduce back reflections. Consequently, the laser 130 may be less subject to damage. Reliability of the EAMR disk drive 100 may thus be improved. The reduction in back reflections also corresponds to a larger percentage of light from the laser 130 being coupled into the waveguide 112. Thus, the coupling efficiency of the laser 130 may be improved. Performance of the laser 130 and, therefore, the EAMR disk drive 100 may thus be improved. The ARC layer 116 may also be used in aligning the laser 130 to the waveguide input 114. A coarse alignment may thus be more easily and rapidly performed. Consequently, fabrication of the EAMR disk drive 100 may be facilitated.

Figure 7:
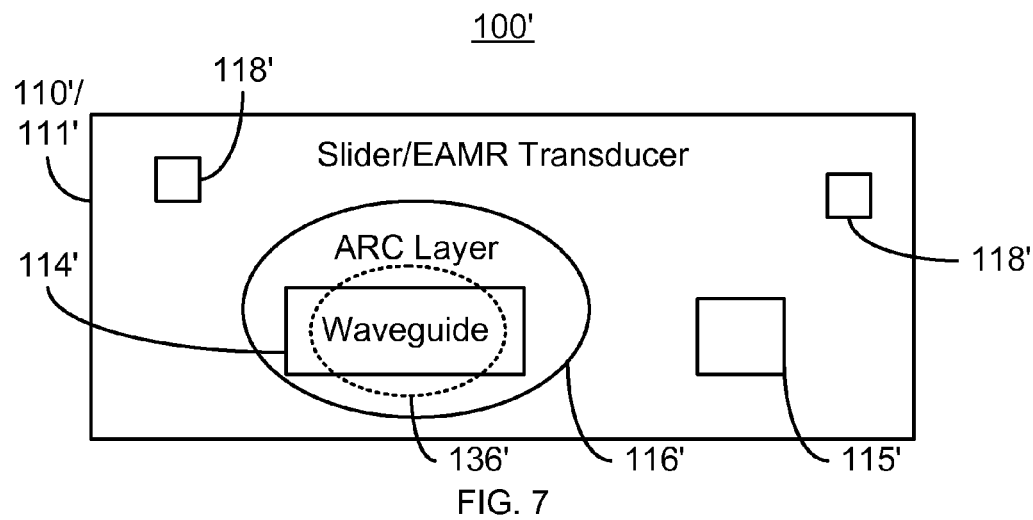
FIG. 7 depicts another exemplary embodiment of a portion of a slider for an EAMR disk drive.

FIG. 7 is a diagram depicting a laser input side of an exemplary embodiment of a slider 110' for an EAMR disk drive 100'. For clarity, FIG. 7 is not to scale. The EAMR disk drive 100' is analogous to the EAMR disk drive 100. The EAMR disk drive 100' thus includes a slider 110', EAMR transducer 111', waveguide input 114', waveguide output 115', ARC layer 116' and, optionally, alignment marks 118' that correspond to the slider 110, EAMR transducer 111, waveguide input 114, waveguide output 115, ARC layer 116 and alignment marks 118, respectively. The ARC layer 116' is on the laser input side 113' and resides between the laser (not shown in FIG. 7) and the input 114' of the waveguide 112'. In the embodiment depicted in FIG. 7, the ARC layer 116' has an elliptical shape that corresponds to the shape of the laser spot 136'. In addition, the waveguide input 114' is not centered in the ARC layer 116. However, the ARC layer 116 still covers the waveguide input 114'. In other embodiments, the waveguide input 114' is centered in the ARC layer 116'.

The EAMR disk drive 100' shares the benefits of the EAMR disk drive 100. In particular, the ARC layer 116' may reduce back reflections and facilitate alignment of the laser 130' and waveguide input 114'. Thus, reliability, performance and manufacturability of the EAMR disk drive 100' may be improved.

Figure 8:
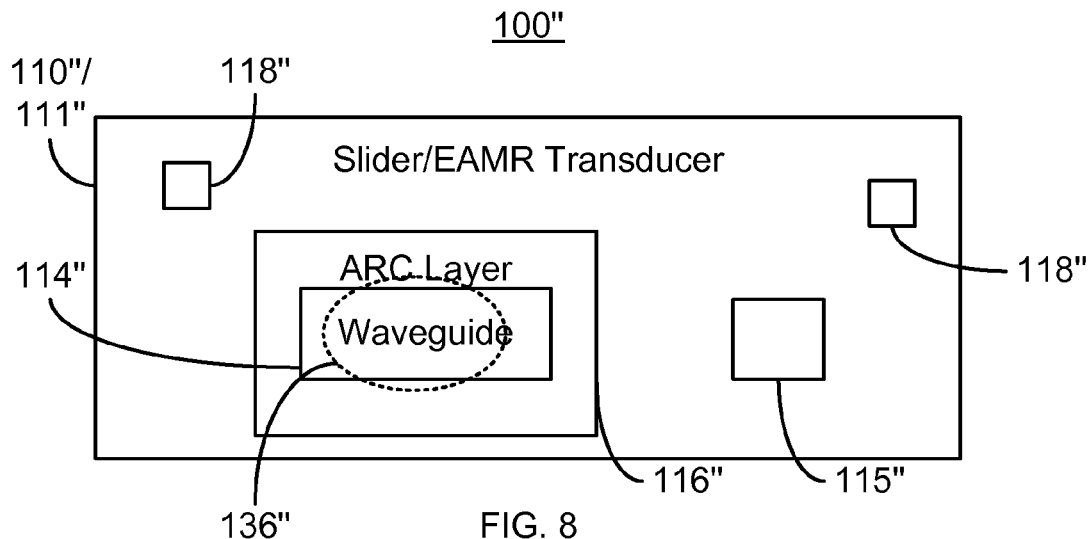
FIG. 8 depicts another exemplary embodiment of a portion of a slider for an EAMR disk drive.
Figure 9:
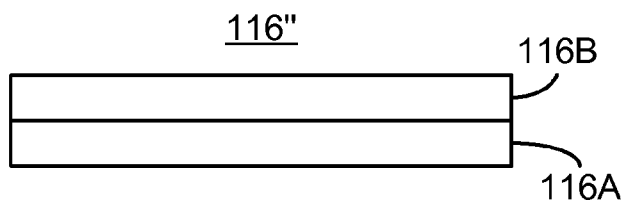
FIG. 9 depicts another exemplary embodiment of an ARC layer for use on a portion of the laser-facing surface of a slider for an EAMR disk drive.

FIGS. 8-9 depicting a laser input side of an exemplary embodiment of a slider 110" and a side view of an ARC layer 116" for an EAMR disk drive 100". For clarity, FIGS. 8-9 are not to scale. The EAMR disk drive 100" is analogous to the EAMR disk drives 100 and 100'. The EAMR disk drive 100" thus includes a slider 110", EAMR transducer 111", waveguide input 114", waveguide output 115", ARC layer 116" and, optionally, alignment marks 118" that correspond to the slider 110/110', EAMR transducer 111/111', waveguide input 114/114', waveguide output 115/115', ARC layer 116/116' and alignment marks 118/118', respectively. The ARC layer 116" is on the laser input side 113" and resides between the laser (not shown in FIGS. 8-9) and the input 114" of the waveguide 112". In the embodiment depicted in FIGS. 8-9, the ARC layer 116" includes two layers 116A and 116B. In another embodiment, additional layers may also be included. The ARC layer 116" is thus a multilayer. Each of the layers 116A and 116B may be an MgF$_2$ layer, a Ta$_2$O$_5$ layer, a SiO$_2$ layer and/or a Si$_3$N$_4$ layer. In other embodiments, other antireflective materials and/or another number of layers may be used. For example, in some embodiments, the ARC layer 116" may include four sublayers.

The EAMR disk drive 100" may share the benefits of the EAMR disk drives 100 and 100'. In particular, the ARC layer 116" may reduce back reflections and facilitate alignment of the laser and waveguide input 114". Thus, reliability, coupling efficiency and fabrication of the EAMR disk drive 100" may be improved. Further, use of the multilayer ARC layer 116' may enhance the ability of the ARC layer 116" in reducing back reflections. Fluctuations in the coupling efficiency with distance between the laser and waveguide input 114" may also be reduced. Thus, performance and manufacturability of the EAMR disk drive 100" may be further improved.

Figure 10:
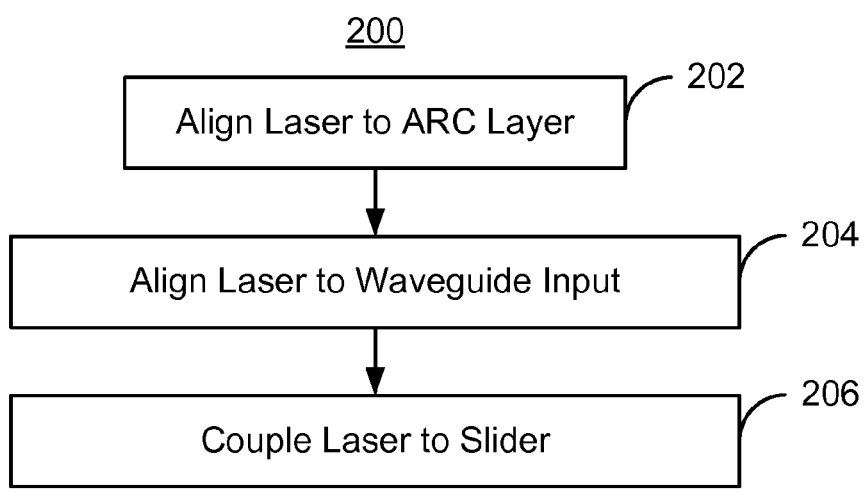
FIG. 10 is a flow chart depicting an exemplary embodiment of a method for aligning a laser to a slider.

FIG. 10 is a flow chart depicting an exemplary embodiment of a method 200 for aligning a laser with a waveguide in fabrication of an EAMR head. For simplicity, only some steps are shown. Further, the steps may include one or more substeps. Steps may also be combined, interleaved, and/or performed in another order. The method 200 is described in the context of fabricating the EAMR disk drive 100 of FIGS. 3-6. However, the method 200 may be used to form another device including but not limited to the EAMR disk drives 100' and 100". The method 200 may start after the alignment marks 118 have been used to roughly align the laser 130 to the ARC layer 116. However, even after this rough alignment has been performed, the laser spot 136 may still be far from the waveguide input 114. For example, only a portion of the laser spot 136 may overlap the ARC layer 116. In other embodiments, the use of alignment marks may be omitted.

The laser 130 is aligned to the ARC layer 116, via step 202. Step 202 may include monitoring back reflections for the laser 130. As the alignment between the laser spot 136 and the ARC layer 116 is improved, back reflections are reduced. A minimum in the back reflections may correspond to the laser 130 being aligned with the ARC layer 116. Thus, the laser spot 136 completely overlaps the ARC layer 116. In embodiments in which the ARC layer 116 extends less than the laser spot diameter from the waveguide input 114, step 202 also ensures that the laser spot at least partially overlaps the waveguide input 114. Thus, a coarse alignment has been performed in step 202.

The laser 130 is then aligned to the waveguide input 114, via step 204. Step 204 may include monitoring the energy output by the waveguide output 115. A maximum in this energy corresponds to the laser spot 136 being aligned with the waveguide input 114. Thus, step 204 performs a fine alignment and may determine the final position of the laser 130/laser spot 136 with respect to the waveguide input 114.

Once the alignment is completed, the laser 130 is coupled with the slider 110, via step 206. Step 206 includes bonding the laser assembly 120 to the slider 110, for example the laser assembly 120 may be epoxied to the slider 110. In another embodiment, the slider 110 and laser assembly 120 are heated to reflow solder pads (not shown). Mechanical and electrical connection is made between the laser 120 and slider 110. Thus, fabrication of the EAMR disk drive may be completed.

Using the method 200, alignment of the laser 130 to the waveguide 112 may be facilitated. In particular, the laser spot 136 may be more quickly and easily brought to a position that is close to the desired alignment with the waveguide input 114. Further, use of the ARC layer 116 may also reduce back reflections. Consequently, manufacturability, reliability, and performance of the EAMR disk drive 100/100'/100" may be improved.

We claim:

1. An EAMR disk drive comprising:
    a media;
    a laser for providing energy;
    a slider having an air-bearing surface, a laser input side, an EAMR transducer and an antireflective coating (ARC) layer occupying a portion of the laser input side, the ARC layer configured to reduce back reflections of the energy, the laser being coupled with the slider, the EAMR transducer including a write pole, a waveguide optically coupled with the laser and at least one coil, the waveguide having a waveguide input, a portion of the ARC layer residing between the laser and the waveguide input, the laser having a laser spot diameter at the laser input side, the portion of the laser input side occupied by the ARC layer including an area covering and greater than the waveguide input and terminating within the laser spot diameter of the waveguide input.

2. The EAMR disk drive of claim 1 wherein the portion of the laser input side occupied by the ARC layer is not smaller than the laser spot size and not smaller than the waveguide input.

3. The EAMR disk drive of claim 2 wherein the portion of the laser input side occupied by the ARC layer is at least twice the laser spot size.

4. The EAMR disk drive of claim 2 wherein the laser has a laser spot shape at the laser input side of the slider and wherein the portion of the laser input side occupied by the ARC layer has an ARC layer shape substantially the same as the laser spot shape.

5. The EAMR disk drive of claim 1 wherein the portion of the laser input side occupied by the ARC layer is at least eight microns long and eight microns wide.

6. The EAMR disk drive of claim 5 wherein the portion of the laser input side occupied by the ARC layer is at least ten microns long and ten microns wide.

7. The EAMR disk drive of claim 1 wherein the portion of the laser input side occupied by the ARC layer has a shape selected from a rectangle, an ellipse, and a circle.

8. The EAMR disk drive of claim 1 wherein the ARC layer includes a plurality of sublayers.

9. The EAMR disk drive of claim 1 wherein the ARC layer includes at least one of a MgF layer, a Ta$_2$O$_5$ layer, a SiO$_2$ layer and a Si$_3$N$_4$ layer.

10. A method for aligning a laser to a waveguide on a slider, the slider including a laser input side and an EAMR transducer having the waveguide, the waveguide having a waveguide input on the laser input side, the method comprising:
    aligning the laser to an antireflective coating (ARC) layer occupying a portion of the laser input side and covering the waveguide input, the ARC layer configured to reduce back reflections of energy from the laser, the laser having a laser spot diameter at the laser input side, the portion of the laser input side occupied by the ARC layer including an area covering and greater than the waveguide input and terminating within the laser spot diameter of the waveguide input;
    aligning the laser to the waveguide input; and
    coupling the laser to the slider.

11. The method of claim 10 wherein the portion of the laser input side occupied by the ARC layer is not smaller than the laser spot size.

12. The method of claim 11 wherein the portion of the laser input side occupied by the ARC layer is at least twice the laser spot size.

13. The method of claim 11 wherein the laser has a laser spot shape at the laser input side of the slider and wherein the portion of the laser input side occupied by the ARC layer has an ARC layer shape substantially the same as the laser spot shape.

14. The method of claim 10 wherein the portion of the laser input side occupied by the ARC layer is at least eight microns long and eight microns wide.

15. The method of claim 14 wherein the portion of the laser input side occupied by the ARC layer is at least ten microns long and ten microns wide.

16. The method of claim 10 wherein the portion of the laser input side occupied by the ARC layer has a shape selected from a rectangle, an ellipse, and a circle.

17. The method of claim 10 wherein the ARC layer includes a plurality of sublayers.

18. The method of claim 10 wherein the ARC layer includes at least one of a MgF layer, a $Ta_2O_5$ layer, a $SiO_2$ layer and a $Si_3N_4$ layer.

19. The method of claim 10 wherein the step of aligning the laser to the ARC layer further includes:
   determining an alignment having reduced back reflections.

20. The method of claim 19 wherein the waveguide include an alignment output and wherein the step of aligning the laser to the waveguide input further includes:
   determining a final alignment for which an output at the alignment output is substantially maximized.

* * * * *